(12) United States Patent
Miernik

(10) Patent No.: US 10,210,584 B2
(45) Date of Patent: Feb. 19, 2019

(54) SYSTEM FOR RECONCILING AN ELECTRONIC STATEMENT OF EVENTS

(71) Applicant: BANK OF AMERICA CORPORATION, Charlotte, NC (US)

(72) Inventor: Jerzy Miernik, Allen, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 364 days.

(21) Appl. No.: 15/005,713

(22) Filed: Jan. 25, 2016

(65) Prior Publication Data

US 2017/0213293 A1 Jul. 27, 2017

(51) Int. Cl.
G06Q 40/00 (2012.01)
(52) U.S. Cl.
CPC .................... *G06Q 40/12* (2013.12)
(58) Field of Classification Search
CPC ...................................... G06Q 40/12
See application file for complete search history.

(56) References Cited

U.S. PATENT DOCUMENTS

| 2011/0020777 | A1* | 1/2011 | Hughes | G06Q 30/02 434/235 |
| 2013/0097566 | A1* | 4/2013 | Berglund | G06F 3/0482 715/863 |
| 2013/0332850 | A1* | 12/2013 | Bovet | H04L 51/22 715/752 |
| 2013/0346914 | A1* | 12/2013 | Jeong | G06F 3/0485 715/784 |
| 2017/0031770 | A1* | 2/2017 | Breedvelt-Schouten | G06F 3/0482 |

* cited by examiner

*Primary Examiner* — Scott A Zare
(74) *Attorney, Agent, or Firm* — Michael A. Springs; Moore & Van Allen PLLC; James C. Edwards

(57) ABSTRACT

The present invention provides for reconciling an electronic statement of events. In this regard, the present provides for presenting, within a GUI, display of events that a user has designated as reconciled in a condensed view, such that the typical single line of text or multi-line text that represents an event is either diminished or removed from the GUI. In additional embodiments of the invention, in response to presenting the condensed view, a second listing, a chart and/or a table may be presented in the GUI alongside the events yet to be reconciled, which lists or indicates the events that have been reconciled. As a result the user is provided with an "at a glance" view of reconciled events/transactions and can readily ascertain the progress that is being made toward completion of the reconciliation process.

17 Claims, 12 Drawing Sheets

| | | | |
|---|---|---|---|
| 302-1 → | DATE 1 | TEXT 1 | AMOUNT 1 |
| 302-2 → | DATE 2 | TEXT 2 | AMOUNT 2 |
| | ⋮ | ⋮ | ⋮ |
| 302-49 → | DATE 49 | TEXT 49 | AMOUNT 49 |
| 302-50 → | DATE 50 | TEXT 50 | AMOUNT 50 |
| | ⋮ | ⋮ | ⋮ |
| 302-100 → | DATE 100 | TEXT 100 | AMOUNT 100 |

┌─────────────────────────────────────────────┐
            │  DATE 1         TEXT 1          AMOUNT 1    │
  304-1 ────┤                                             │
            │     DETAIL LINE 2                           │
            │     DETAIL LINE 3...                        │
            ├─────────────────────────────────────────────┤
  302-2 ────┤  DATE 2         TEXT 2          AMOUNT 2    │
            ├─────────────────────────────────────────────┤
  302-3 ────┤  DATE 3         TEXT 3          AMOUNT 3    │
            │                                             │
            │                     •                       │
            │                     •                       │─── 301
            │                     •                       │
            │                                             │
            ├─────────────────────────────────────────────┤
 302-47 ────┤  DATE 47        TEXT 47         AMOUNT 47   │
            │                                             │
            │                     •                       │
            │                     •                       │
            │                     •                       │
            │                                             │
            ├─────────────────────────────────────────────┤
302-100 ────┤  DATE 100       TEXT 100        AMOUNT 100  │
            └─────────────────────────────────────────────┘
```

FIG. 4

| | | | |
|---|---|---|---|
| 304-1 → | DATE 1 | TEXT 1 | AMOUNT 1 |
| | DETAIL LINE 2 | | |
| | ⋮ | | |
| | DETAIL LINE 15 | | |
| 302-2 → | DATE 2 | TEXT 2 | AMOUNT 2 |
| 304-3 → | DATE 3 | TEXT 3 | AMOUNT 3 |
| | DETAIL LINE 3-2 | | |
| | ⋮ | | |
| | DETAIL LINE 3-18 | | |
| 302-4 → | DATE 4 | TEXT 4 | AMOUNT 4 |
| 302-5 → | DATE 5 | TEXT 5 | AMOUNT 5 |
| | ⋮ | | |
| 302-100 → | DATE 100 | TEXT 100 | AMOUNT 100 |

| | | |
|---|---|---|
| DATE 1 | TEXT 1 | AMOUNT 1 |
| DATE 2 | TEXT 2 | AMOUNT 2 |
| DATE 3 | TEXT 3 | AMOUNT 3 |
| DATE 4 | TEXT 4 | AMOUNT 4 |
| ⋮ | ⋮ | ⋮ |
| DATE 52 | TEXT 52 | AMOUNT 52 |
| ⋮ | ⋮ | ⋮ |
| DATE 100 | TEXT 100 | AMOUNT 100 |

SYSTEM FOR RECONCILING AN ELECTRONIC STATEMENT OF EVENTS

FIELD

In general, embodiments of the invention relate presentation of information in Graphical User Interfaces (GUIs) and, more specifically, providing for presentation of information within GUIs that provide a listing/statement of events such that the statement can readily indicate reconciled events within the display of the GUI.

BACKGROUND

In many instances it is easier and more efficient for a user to reconcile statements of events, such as statements of financial transactions conducted by the user, in hard copy/paper form than is possible in an electronic form. In this regard, the hard copy/paper form allows the user the ability to highlight, strike-through or otherwise mark a text line associated with an event/transaction that the user desires to indicate as a reconciled event/transaction (i.e., an event/transaction that the user verifies has occurred and is accurately indicated in the listing/statement. As the user progresses through the statement/listing reconciling events, the user can readily ascertain which events/transactions have been reconciled, based on the highlighting/marking or the like and which events/transactions remain to be reconciled, based on the lack of highlighting/marking or the like. Once all of the user has completed the process and all of the events/transactions have been highlighted/marked to indicate reconciliation, the hard copy/paper form of the statement/listing provides the user with "at a glance" proof that all of the events/transactions have been reconciled and that no unexpected or inaccurate events/transactions exist on the statement/listing.

In the electronic form reconciliation becomes somewhat problematic. Certain forms of files, such as a Portable Document Format (PDF) files or the like, are not readily configured to allow for editing. Such files would require printing in order to perform reconciliation, which is viewed as a less than desirable resource and time consuming endeavor. In other instances, in which the statement/listing is presented in an editable format, such as a web-based, online or mobile presentation of a statement/listing, other problems exist. For example, typically a listing/statement includes a large number of events/transactions, which cannot all be displayed simultaneously on the display of the user's device, resulting in the need for scrolling through various pages in order to view and reconcile all of the events/transactions in the listing/statement. This problem becomes heightened when the user's device is a portable device, such as a smart phone or the like, which has a smaller display than a conventional computing device (e.g., a PC, laptop or the like) and, as such, is limited in the number of events/transactions that can simultaneously be displayed on the device's display (i.e., more page scrolling is warranted).

Furthermore, electronic listings/statements typically present events/transactions in single-line format, each line representing an event/transaction and including limited information about the event/transaction (e.g., date, transacting entity, amount or the like). In order for the user to see further details associated with the event/transaction, which are typically required in the reconciliation process, the events/transactions in the listing/statement are configured as activatable keys/widgets/soft buttons. Once the user activates a key/widget/soft button, the user is provided with an expanded view (i.e., multiple lines of text or the like) that includes further details associated with the event/transaction. While a user may subsequently collapse the expanded view back to the single-line format, in many instances, the expanded view is the only way that a user can mark or otherwise indicate in the electronic format that an event/transaction has been reconciled. In such instances, the user is left with no other option than to present all of the events/transactions in the list in the expanded view in order to complete the reconciliation process. Such expanded views exasperates the problem of presenting information within the limited confines of a display area and, as such, result in the need for even more page scrolling. Such page scrolling makes completing the reconciliation process a daunting task because the user is apt to unknowingly omit one or more events/transactions from the reconciliation process. In this regard, the page scrolling intensive reconciliation process provides the user with no "at a glance" means for customer to insure that all events/transactions within the listing/statement have been reconciled. Alternatively, a user may expand all the lines initially, prior to reconciliation, then collapse each multi-line field after reconciliation to "mark" each entry as reconciled. However, such a practice is time-consuming and inconvenient as it requires the user to expand and collapse all of the entries, which necessitates even further scrolling/paging.

Therefore, a need exists to develop systems, apparatus, methodologies and the like for reconciling electronic listings/statements of events/transactions. The desired systems and the like should provide the same, or improved, ease and/or efficiency than hard copy/paper processing of statement reconciliation. In this regard, the desired systems and the like should provide for a user to be able to readily identify events/transactions that are reconciled and provide the user with an "at a glance" means of indication of the completion of the reconciliation process. Moreover, the desired systems and the like should limit the amount of page scrolling, regardless of the platform on which the user is viewing the listing/statement of events/transactions (i.e., the platform on which the user is conducting the reconciliation process).

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for reconciling an electronic statement of events, such as an electronic financial account statement of transactions conducted by a user/customer. The present invention affords the user the ability to reconcile an electronic statement of events, such as an electronic financial account statement of transactions with at least the same, if not improved, ease and/or efficiency that is afforded a hard copy/paper process of statement reconciliation. In this regard, the present invention is able to allow for a user to readily identify events/transactions that are reconciled and provide the user with an "at a glance" indication of the completion of the reconciliation process. As a result, the user limits and in some instances eliminates, the need for page scrolling, regardless of the device platform on which the user is viewing the listing/statement of events/transactions.

Specifically, the present invention provides for presenting a Graphical User Interface (GUI) that is configured to receive an input that replaces display of one or more lines of text representing an event in a listing or events, with display of a condensed view of the event within the listing. The condensed view signifies that the event has been reconciled and occupies less area in the GUI than the one or more lines of text. In this regard the condensed view may include smaller font-sized text than the text used in the one or more lines of text or may remove the event from the listing, altogether. In those embodiments in which the event is removed from the listing, a consolidated icon may be displayed in place of the event; such small font-size line of text, a geometric shape or the like that indicates to the user that the event has been reconciled. As a result of the condensed view of reconciled events, the present invention provides for allowing the user to view most, if not all, of the reconciled events in the listing within a single view/display of the GUI (i.e., limiting, and, in some instances, eliminating, the need for the user to scroll through various pages) regardless of the display platform (i.e., regardless of the size of the display platform).

An apparatus for reconciling an electronic statement of events defines first embodiments of the invention. The apparatus includes a computing platform having a memory and at least one processor in communication with the memory. The apparatus further includes a statement of events graphical user interface (GUI) module (otherwise referred to as financial account statement GUI module) that is stored in the memory and executable by the processor. The module is configured to provide display of a graphical user interface (GUI) that includes a first listing of events, each event in the first listing being represented by one or more lines of text. The module is further configured to receive a reconciliation acknowledgement input from a user that selects an event from the first listing and, in response to receiving the reconciliation acknowledgement input, replaces the one or more lines of text in the first listing of the GUI with display of a condensed view of the event within the first listing. The condensed view signifies that the event has been reconciled and occupies less area in the GUI than the one or more lines of text.

In specific embodiments of the apparatus, the module is further configured to provide display of a plurality of reconciliation keys/widgets, otherwise referred to soft buttons or click-sensitive areas, each key/widget associated with a corresponding event in the first listing. In such embodiments of the apparatus, the reconciliation acknowledgement input is activation of the reconciliation key/widget associated with the event.

In other specific embodiments of the apparatus, the condensed view includes a smaller font-size than the font size used in the one or more lines of text or provides for the event to be removed from the first listing. In those embodiments in which the event to be removed from the first listing, the condensed view includes an icon, in place of the one or more lines of text, that signifies that the event has been removed from the first listing. In such embodiment of the apparatus, the icon may be represented as one or more continuous or non-continuous horizontal lines, one or more sinusoidal lines, or a geometric shape (e.g., rectangle or the like) that outlines a least a portion of an area previous occupied by the one or more lines of text. In further related embodiments of the apparatus, the icon may be visually-coded (e.g., color-coded or the like) to identify a type of the event.

In further specific embodiments of the apparatus in which the module is configured to display in the GUI the condensed view and/or remove the event/line(s) of text from the listing, the GUI may be configured to display at least one of (i) a second listing of reconciled events, wherein the second listing includes at least one identifying parameter associated with each reconciled event, (ii) a graphical chart that indicates each reconciled event in relation to all of the events in the first listing, or (iii) a table that includes a position for all of the events in the first listing, wherein a visual indicator is provided in a corresponding position of the table to indicate a reconciled event. In such embodiments of the apparatus, the reconciled events in either the second listing, the graphical chart or the table may be provided as activatable keys/widgets that are configured, upon user activation, to provide for at least one of (i) display of further details about the corresponding reconciled event, or (ii) re-display in the first listing of the GUI of the single line or multi-line of text.

In further specific embodiments of the apparatus, the statement of events GUI module is further configured to receive a reinstatement input from the user that selects the condensed view of the event from the first listing and, in response to receiving the reinstatement input, replaces the condensed view with re-display, in the first listing of the GUI, of the single line or multi-line of text.

A system for reconciling an electronic financial account statement of transactions defines second embodiments of the invention. The system includes one or more financial account databases that are configured to store records of users' credit and debit transactions. The system further includes a financial account statement graphical user interface (GUI) module that is stored in computing memory and executable by a processor. The module, which may be accessible via an online banking website or mobile banking application, is configured to access the financial account database to retrieve records associated with a user's financial transactions (e.g., credit transactions, debit transaction and the like). The module is further configured to, in response to retrieving the records, provide network-accessible display of a graphical user interface (GUI) that includes a first listing of financial transaction entries, each entry in the first listing (i) associated with one of the user's financial transactions, (ii) including information from the records and (iii) displayed in one or more lines of text. In addition, the module is configured to receive a reconciliation acknowledgement input that selects a financial transaction entry from the first listing and, in response to receiving the reconciliation acknowledgement input, replaces the one or more lines of text in the first listing with display of a condensed view of the financial transaction entry within the first listing. The condensed view signifies that the financial transaction has been reconciled and occupies less area in the GUI than the one or more lines of text.

In specific embodiments of the system, the condensed view includes a smaller font-size that the font-size used in the one or more lines of text or provides for the financial transaction entry to be removed from the first listing. In those embodiments in which the financial transaction entry is removed from the first listing, the condensed view may include an icon, in place of the one or more lines of text that signifies that the financial transaction entry has been removed from the first listing. In such embodiment of the apparatus, the icon may be represented as one or more continuous or non-continuous horizontal lines, one or more sinusoidal lines, or a geometric shape (e.g., rectangle or the like) that outlines a least a portion of an area previous occupied by the one or more lines of text. In further related embodiments of the apparatus, the icon may be visually-coded (e.g., color-coded or the like) to identify a type of the event.

In further specific embodiments of the system, the financial account statement GUI module is further configured, in response to displaying in the GUI a condensed view of the financial transaction entry, provide display in the GUI of at least one of (i) a second listing of reconciled financial transaction, wherein each entry in the second listing includes at least one identifying parameter associated with a corresponding financial transaction, (ii) a graphical chart that indicates each reconciled financial transaction in relation to all of the financial transactions in the first listing, or (iii) a table that includes a position for all of the financial transactions in the first listing, wherein a visual indicator is provided in a corresponding position of the table to indicate a reconciled financial transaction.

A computer program product including a non-transitory computer-readable medium defines third embodiments of the invention. The computer-readable medium includes a first set of codes for causing a computer to access a financial account database to retrieve records associated with a user's financial transactions (e.g., credit transactions, debit transactions or the like). The computer-readable medium additionally includes a second set of codes for causing a computer to, in response to retrieving the records, provide network-accessible display of a graphical user interface (GUI) that includes a first listing of financial transaction entries, each entry in the first listing (i) associated with one of the user's financial transactions, (ii) including information from the records, and (iii) displayed in one or more lines of text. Moreover, the computer-readable medium includes a third set of codes for causing a computer to receive a reconciliation acknowledgement input that selects a financial transaction entry from the first listing and, in response to receiving the reconciliation acknowledgement input, replaces the one or more lines of text in the first listing of the GUI with display of the condensed view of the financial transaction entry within the first listing. The condensed view signifies that the financial transaction has been reconciled and occupies less area in the GUI than the one or more lines of text.

Thus, systems, apparatus, methods, and computer program products herein described in detail below provide for an efficient means by which electronic listing of events, such as statements of financial transactions, may be reconciled. In this regard, embodiments of the invention provide for presenting, within a GUI, events/transactions that a user has designated as reconciled in a condensed view, such that the typical single line of text or the multi-line/expanded view that represents an event/transaction is either diminished or removed from the GUI. As a result the user is provided with an "at a glance" view of reconciled events/transactions, which limits, and in some cases eliminates, the need for page scrolling.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
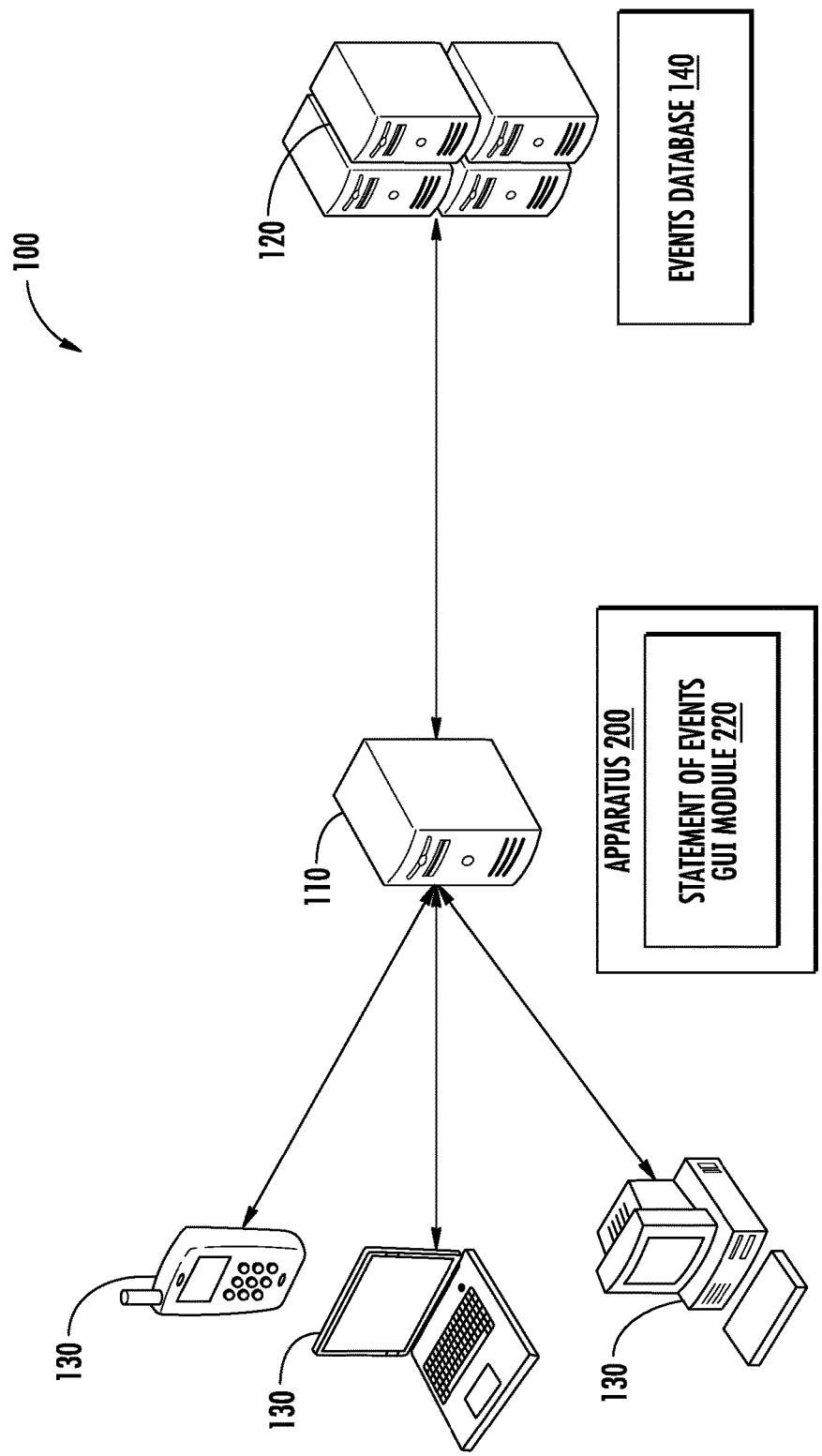
Figure 2:
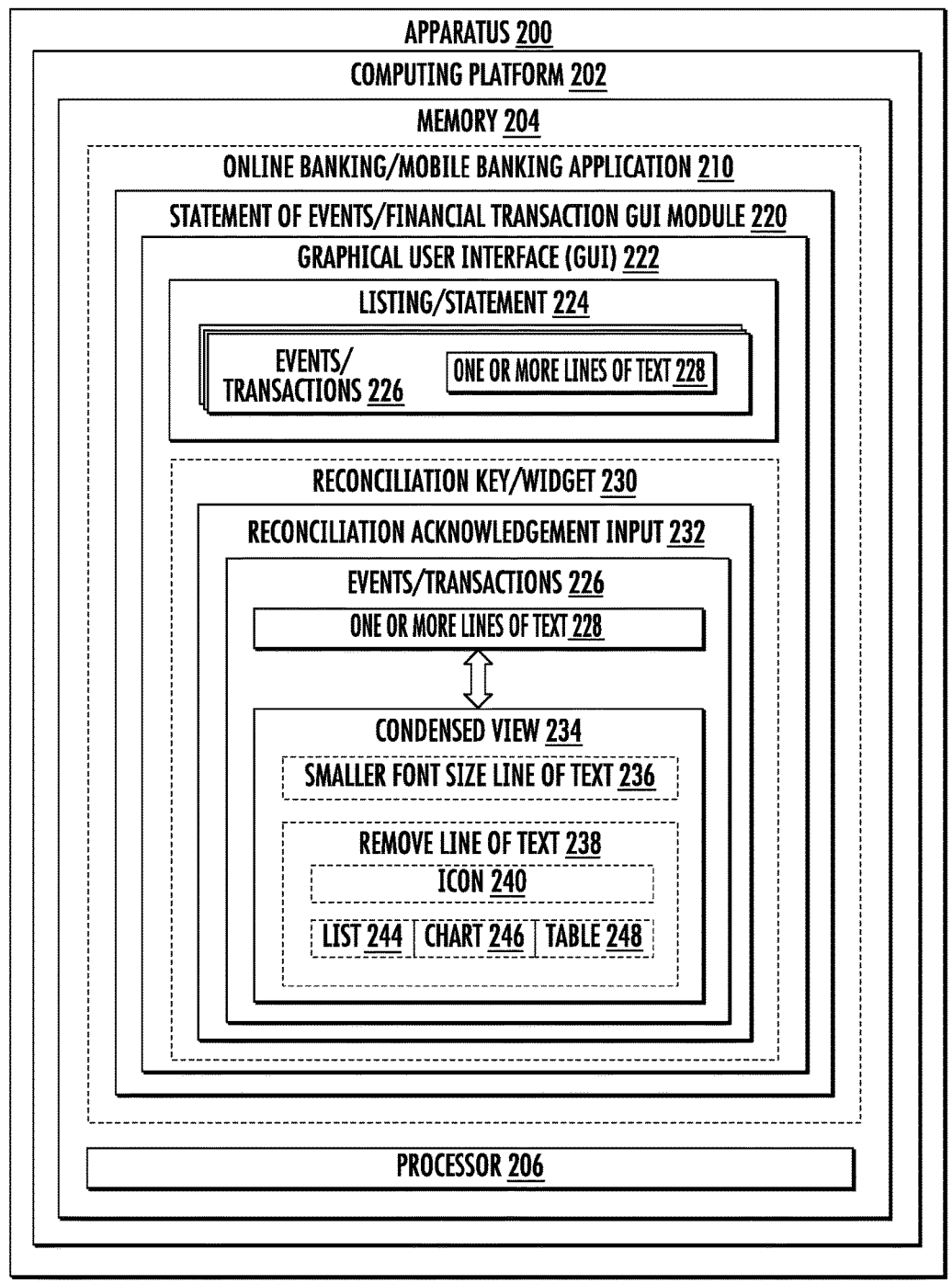

Having thus described embodiments of the invention in general terms, reference will now be made to the accompanying drawings, which are not necessarily drawn to scale, and wherein:

FIG. 1 provides a schematic diagram of an exemplary system for providing reconciliation of events within an electronic statement of events, in accordance with embodiments of the present invention;

FIG. 2 provides an apparatus for providing reconciliation of events within an electronic statement of events, in accordance with embodiments of the present invention; and FIGS. 3-11 provide examples of Graphical User Interfaces (GUIs) provided for reconciliation of events, such as financial transactions within an electronic statement, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for reconciling electronically listed events, such as statements of financial transactions. In this regard, the embodiments of the present invention provide for presenting, within a GUI, events/transactions that a user has designated as reconciled in a condensed view, such that the typical single line of text or the multi-line/expanded view that represents an event/transaction is either diminished or removed from the GUI. Moreover, in other specific embodiments of the invention, in response to presenting the condensed view; a second listing, a chart and/or a table may be presented in the GUI alongside the events/transactions yet to be reconciled, which lists or indicates the reconciled events/transactions. As a result the user is provided with an "at a glance" view of reconciled events/transactions and can readily ascertain the progress that is being made toward completion of the reconciliation process.

Referring to FIG. 1, a schematic diagram is provided of a system 100 for reconciling an electronic statement of events, in accordance with embodiments of the present invention. The system includes events database 140, which may comprise, in specific embodiments, a financial account database. The database 140 is configured to store records of events, which may include, in specific embodiments, records of a users'/customers' financial transactions, such as, but not limited to, credit transactions, debit transactions or the like.

In addition, system 100 includes apparatus 200 which stores statement of events Graphical User Interface (GUI) module 220. In those embodiments in which the statement of events GUI module 220 comprises a financial account statement of transactions GUI module, the module 220 may be part of an online banking application and/or a mobile banking application or the like.

The statement of events GUI module 220 is configured to access the events database 140 to retrieve records associated with a user's events and, in response to retrieving the records, provide network-accessible display of a GUI that includes a listing of event entries. Each event entry is associated with a corresponding event conducted by the user and includes information from the records associated with the event. The network-accessible display may be provide to a user on any network-accessible computing device such as a mobile device, i.e., mobile telephone 130A, laptop 130B, or a conventional computing device, such as personal computer 130C or the like. Moreover, each event entry is displayed, within the GUI, as one or more lines of text. In those embodiments in which the statement of events GUI module 220 comprises the financial account statement of transactions GUI module, the module 220 is configured to access the financial account database to retrieve records associated with the user's financial transactions and, in response to retrieving the records, provide network-accessible display of the GUI that includes a statement of financial transaction entries. Each financial transaction entry corresponding to one of the user's financial transactions and including, within a single line of text, information from the records, such as date, transacting party, amount or the like.

The statement of events GUI module 220 is configured to receive an input from a user that selects one of the event entries from the listing and, in response to receiving the input, replacing the one or more lines of text in the listing with display of a condensed view of the event entry. The condensed view signifies that the event has been reconciled and is occupies less area in the GUI than the one or more lines of text. In specific embodiments of the invention, occupying less area in the GUI than the one or more lines of text provides for smaller font-size that the font-size used in the one or more lines of text or removing the one or more lines of text, altogether. In such embodiments in which the one or more lines of text is removed, the text may be replaced by an icon, such as, but not limited to a single or double, continuous or non-continuous, straight or sinusoidal line, a geometric shape, e.g., a rectangle or the like. In other such embodiments of the invention, display of the condensed view may result in display of a listing of reconciled event, a graphical chart of reconciled events and/or a table of reconciled events, which allow the user to readily ascertain their progress towards completing the reconciliation process.

Referring to FIG. 2 a block diagram is depicted of an apparatus 200 configured for reconciling statements of events, in accordance with embodiments of the present invention. Apparatus 200 includes a computing platform 202 having a memory 204 and at least one processor 206 in communication with the memory 204. Apparatus 200 may comprise multiple devices, such as multiple servers, storage devices, personal computers and the like.

Memory 204 may comprise volatile and non-volatile memory, such as read-only and/or random-access memory (RAM), read-only memory ROM, EPROM, EEPROM, flash cards, or any memory common to computer platforms. Further, memory 204 may include one or more flash memory cells, or may be any secondary or tertiary storage device, such as magnetic media, optical media, tape, or soft or hard disk. Moreover, memory 204 may comprise cloud storage, such as provided by a cloud storage service and/or a cloud connection service.

Further, processor 206 may be an application-specific integrated circuit ("ASIC"), or other chipset, processor, logic circuit, or other data processing device. Processor 206 or other processor such as ASIC may execute an application programming interface ("API") (not shown in FIG. 2) that interfaces with any resident programs or modules, such as statement of events/financial transactions GUI 220 and routines, sub-modules associated therewith or the like stored in memory 204 of apparatus 200. Processor 206 includes various processing subsystems (not shown in FIG. 2) embodied in hardware, firmware, software, and combinations thereof, that enable the functionality of apparatus 200 and the operability of the apparatus 200 on a computing network. For example, processing subsystems allow for initiating and maintaining communications and exchanging data with other networked computing platforms. For the disclosed aspects, processing subsystems of processor 106 may include any subsystem used in conjunction with statement of events/financial transaction GUI module 220 and related algorithms, sub-algorithms, modules, sub-modules thereof.

Computer platform 202 may additionally include a communications module (not shown in FIG. 2) embodied in hardware, firmware, software, and combinations thereof, that enables communications among the various components of the computing platform 202, as well as between the other networked devices. Thus, communication analysis module may include the requisite hardware, firmware, software and/or combinations thereof for establishing and maintaining a network communication connection.

Memory 204 stores optional online banking and/or mobile banking application 210, which may, in specific embodiments of the invention, in which the statement of events GUI module 220 is a financial account statement of transactions GUI module, include the module 220. The module 220 is configured provide display of a Graphical User Interface (GUI) 222 that includes a listing/statement 224 of events entries 226, such as financial transactions conducted by a user/customer or the like. In accordance with embodiments of the invention, each event entry 226 comprises one or more lines of text 228, which includes event/transaction identifying information, such as, but not limited to, a date of the event/transaction, a transacting party (e.g., retailer or the like), an amount of the transaction or the like.

In specific embodiments of the invention, the GUI 222 is configured to include a plurality of reconciliation keys/widgets 230, otherwise referred to as soft buttons or click-sensitive areas within the GUI 222. Each reconciliation key/widget 230 is associated with a corresponding event/transaction entry 226. The reconciliation key/widget 230 is configured to receive a reconciliation acknowledgement input 232 from a user that selects an event/transaction 226 from the listing/statement 224. In response to receiving the reconciliation acknowledgement input 232, the module 220 replaces the one or more lines of text 228 with display of a condensed view 234 of the event/transaction entry 226. The condensed view 234 signifies that the event has been reconciled and occupies less area in the GUI 222 than the previous one or more lines of text 228. The reconciliation acknowledgement input 232 differs from a conventional input, which selects an event transaction 226 and provides for display of an expanded view (as shown in FIGS. 4 and 5). An expanded view typically includes multiple lines of texts and in some instances images (i.e., check images or the like) and, as such, occupies more area in the GUI 222 than would be occupied by one or more lines of text 228.

In specific embodiments of the invention, the module 220 is configured, in response to receiving the input reconciliation acknowledgement 232, to replace the one or more lines of text 228 with condensed view 234 in the form of a smaller font-size single line of text 236, which results in the event/transaction entry 226 taking up less vertical area than the previous standard font-size one or more lines of text 228. In other specific embodiments of the invention, the module 220 is configured, in response to receiving the reconciliation acknowledgement input 232, to remove 238 the one or more lines of text 228. In such embodiments of the invention, the one or more lines of text 228 may be removed and replaced with an icon 240, which may take the form of a single or double line, and/or continuous or non-continuous line and/or a straight or sinusoidal, or a geometric shape, such as rectangle or the like. The icon 240 will be configured to occupy less area than the previous one or more lines of text 228. In other specific embodiments of the invention, the module 220 is configured, in response to receiving the reconciliation acknowledgement input 232, to present display, within the GUI of at least one of a second listing/statement 242 of reconciled events/transactions, a graphical chart 244 that indicates reconciled events/transactions in relation to all of the events/transaction entries 226 in the listing/statement 224, and a table that includes positions for reconciled events/transactions in relation to all of the events/transaction entries 226 in the listing/statement 224.

Referring to FIGS. 3-11 are exemplary Graphical User Interfaces (GUIs) 300 displayed in accordance with embodiments of the present invention. FIG. 3 depicts the GUI 300 that is initially presented to a user upon accessing an electronic statement of events/transactions. In the illustrated example of FIG. 1 the GUI 300 is configured for a mobile device, although in other embodiments of the invention the GUI 300 may be configured for any other computing device, such as a laptop, PC or the like. The listing 301 or statement includes a plurality of event/transaction entries 302-1, 302-2 and the like. Each event/transaction entry 302-1, 302-2 and the like is represented by one or more lines of text and includes information retrieved from an event/transaction database. In the illustrated embodiment of FIG. 1, in which the event is a transaction, each event/transaction entry 302-1, 302-2 and the like includes a date of the event/transaction; identifying text, such as transacting entity or the like; and an amount of the transaction. In the illustrated embodiment of the invention, the listing 301 includes one-hundred (100) event/transaction entries 302-1-302-100. In most instances, due to display size, all 100 event transaction entries will not be displayed to the user at one time (i.e., displayed within a single view). For example, in the illustrated embodiment of FIG. 1, the GUI 300 is configured to display fifty (50) event transaction entries 302-1-302-50 on a single display/page. As such, the user is required to scroll or move to a subsequent page to provide for display of the additional event/transaction entries, i.e., event/transaction entries 302-51-302-100.

Referring to FIG. 4, the GUI 300 is shown after a user has selected an event/transaction entry 302 as a means of viewing more details about the event/transaction; in accordance with embodiments of the present invention. Specifically, a user has selected event/transaction entry 302-1 (shown in FIG. 1), which results in display of the expanded view 304-1 shown in FIG. 4. Selection of an event/transaction entry 302 may include a user "clicking-on" the event/ transaction entry, or activating an associated key/widget (not shown in FIG. 4) designated for more details/expanded view. The expanded view 304, which comprises more than one line of text, includes further details about the event/transaction. Since the expanded view 304 of the event/transaction entry takes up more area in the display, the number of event/transaction entries that can be viewed by the user within a single view/page is decreased. For example, in the illustrated example of FIG. 4, the single view/page is limited to displaying forty-seven (47) event/transaction entries 302-47. While the GUI 300 is typically configured for a user to select or "click-on" the expanded view 304 as a means of returning to the standard single text line view, in many instances, if the user is using the expanded view 304 to indicate a reconciled event/transaction, the user will progress through selection of all of the event/transaction entries 302 until all of the entries have been reconciled (i.e., all of the entries depict the expanded view 304).

In FIG. 5 the GUI 300 is shown after the user has selected two event/transaction entries 302 for more details/expanded view. Specifically, in the illustrated example of FIG. 5, the user has selected event/transaction entries 302-1 and 302-3, which results in display of the expanded views 304-1 and 304-3 shown in FIG. 5. The expanded views 304-1 and 304-3 of FIG. 5 include significantly more text lines (i.e., fifteen and eighteen line, respectively) and, as such, take up significantly more area within the display. As a result, the number of event transaction entries and/or expanded views that can be viewed by the user within the single view/page is decreased to five event/transaction entries 302 and/or expanded views 304. The reader can readily appreciate that if the user is using the expanded view 304 as the means of indicting a reconciled event/transaction, the user will be required to perform significant scrolling/paging in order complete the reconciliation process. Such scrolling/paging is not only inefficient but the user is prone to missing event/transaction entries 302 (i.e., believing they have completed the reconciliation process when, in fact, one or more event/transaction entries remain that require reconciliation).

Figure 6:
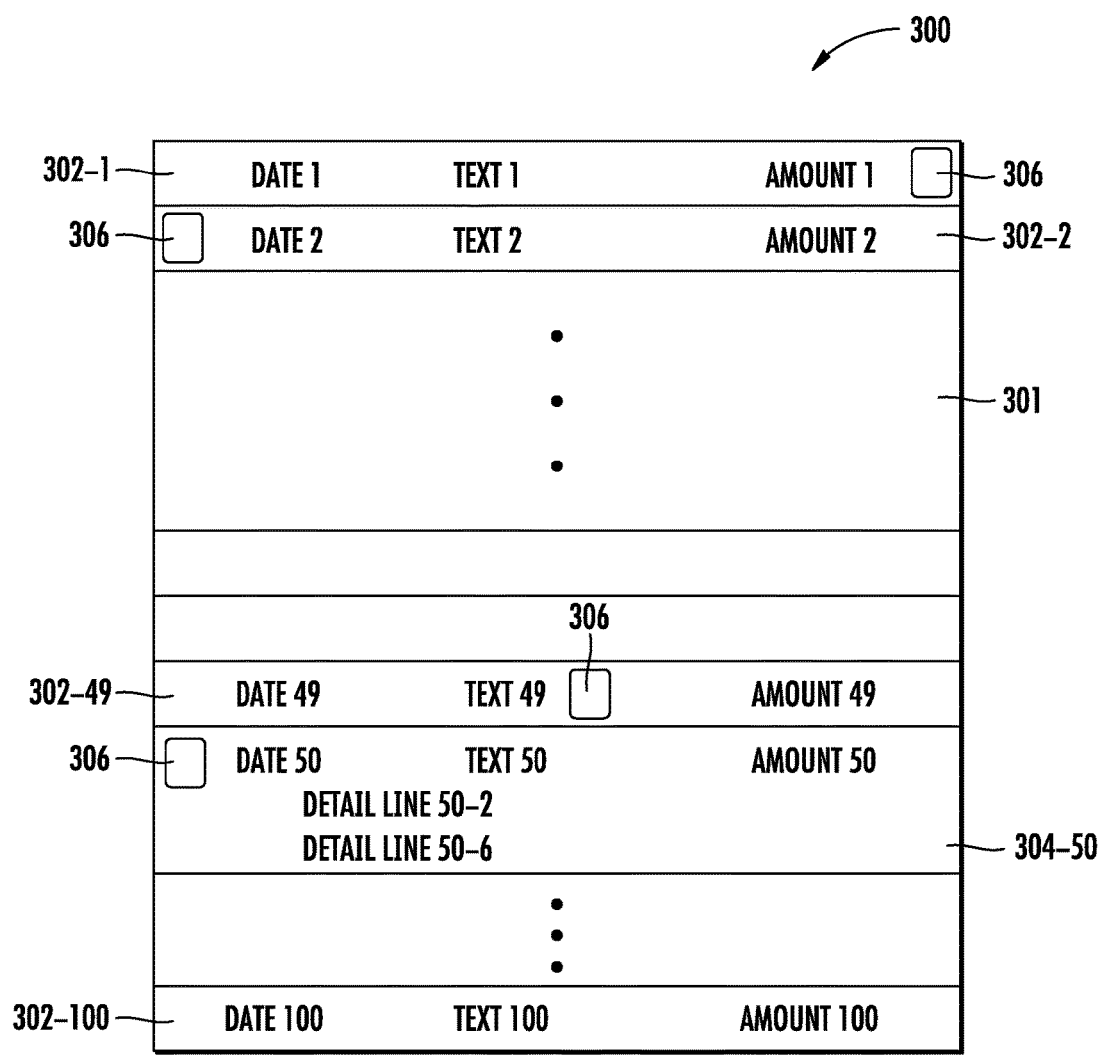

FIG. 6 highlights the GUI 300 in which an associated reconciliation key/widget 306 has been added to event/transaction entries 302. Specifically, FIG. 6 highlights various examples of where the reconciliation key/widget 306 may be positioned within the GUI 300 in relation to the corresponding event/transaction entry 302. Specifically, event/transaction entry 302-1 depicts a reconciliation key/widget positioned to the right-hand side of the single line of text, event/transaction entry 302-2 depicts a reconciliation key/widget positioned to the left-hand side of the single line of text, and event/transaction entry 302-49 depicts a reconciliation key/widget positioned to within the single line of text. It should be noted that while FIG. 6 shows the reconciliation key/widget 306 positioned at various locations within the GUI, in actual practice, the GUI would likely be configured such that all of the reconciliation key/widget 306 are consistently positioned in the same location (i.e., all of the reconciliation key/widgets 306 would be positioned to the right-hand or left-hand side of the single line of text or within the single line of text. In accordance with embodiments of the present invention, the reconciliation key/widget 306 is configured to be activated (i.e., clicked-on or the like) by the user to present a condensed view of the corresponding event/transaction entry. In other embodiments of the invention, the event, transaction entry 302 itself may be configured as a reconciliation key/widget, such that, selecting (i.e., clicking-on or the like) any portion of the entry is equivalent in function to activating the reconciliation key/widgets 306 shown in FIG. 6 (i.e., results in display of the condensed view). As well, in other embodiments of the invention, the reconciliation key/widget 306 is located within the expanded view 304, specifically, as shown in FIG. 6 a reconciliation key/widget is included within expanded view 304-50 positioned to the left-hand side of the of the first line of text. In other embodiments of the invention in which the reconciliation key/widget 306 is located within the expanded view 304, the reconciliation key/widget may be positioned on the left-hand side, the right-hand side or within any line of text within the expanded view 304 The condensed view (examples of which are provided in FIGS. 7A/B-10) signifies that an event/transaction has been reconciled (in other words "verified") and characteristically occupies less area in the GUI 300 than the standard event/transaction entry 302 (i.e., less area than the standard single line of text).

FIG. 7A depicts one embodiment of the invention in which the condensed view 308-1 and 308-3 comprises smaller font-size text than the standard single line of text of event/transaction entries, such as 302-1, 302-52, 302-100 and the like. Since the smaller font-size text occupies less area in the display of the GUI 300, the number the number of event transaction entries 302 and/or condensed views 308 that can be viewed by the user within the single view/page is increased. Specifically, in the illustrated embodiment of FIG. 7A, fifty-two (52) event/transaction entries 308 and/or condensed views 308 are viewable within the single view/page of the display. As the user progresses through the reconciliation process, and more and more condensed views 308 are displayed, it is conceivable that all one-hundred (100) of the event/statement entries (or a significant portion thereof) may be displayed to the user in a single view/page (i.e., eliminating, or at least lessening, the need to scroll or page through event/transaction entries). Moreover, the condensed view 308 may be configured such that selection (i.e., clicking-on or the like) of the condensed view 308 re-displays the standard event/transaction entry 302, i.e., the single line of standard font-sized text.

Figure 7B:
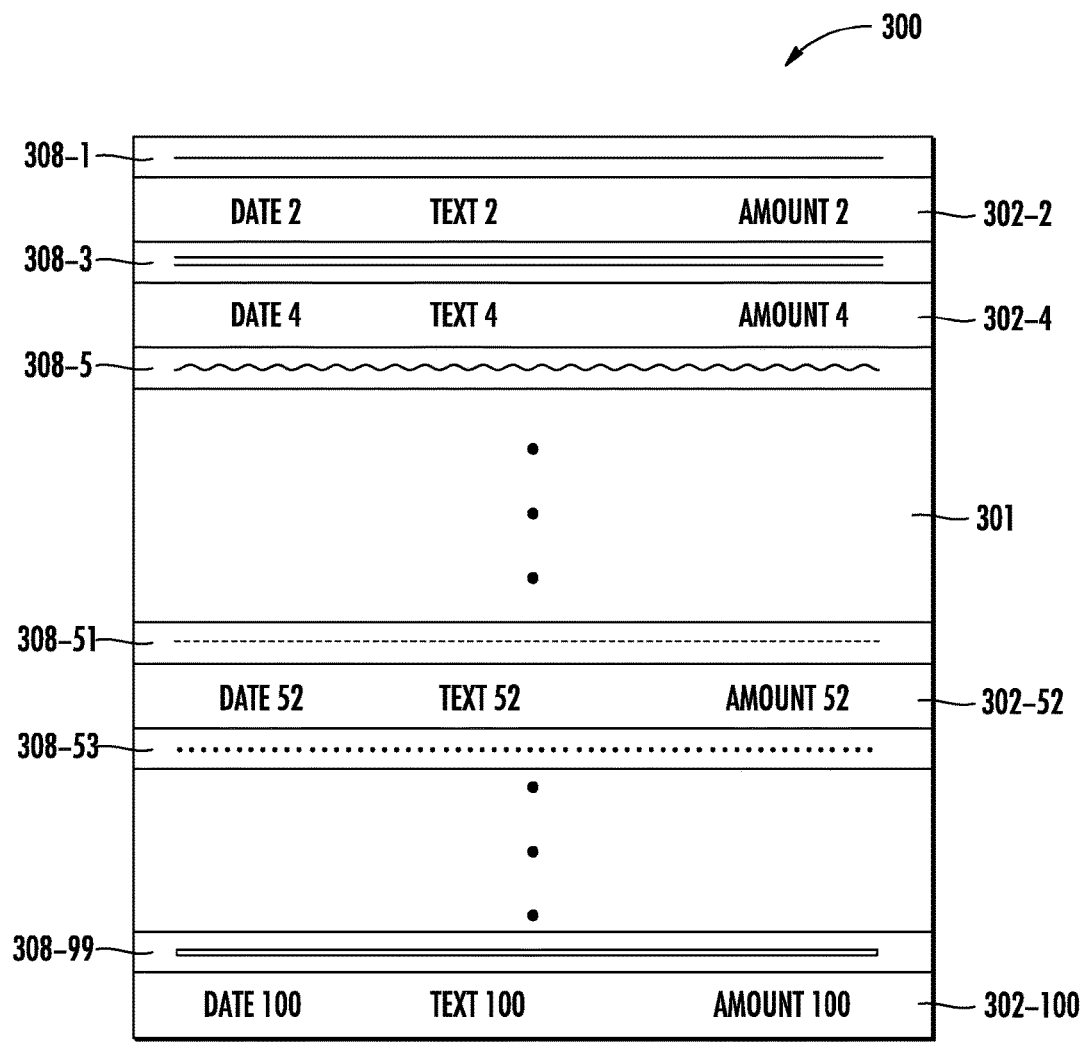

FIG. 7B depicts embodiments of the invention in which the condensed view 308-1, 308-3, 308-5, 308-51, 308, 53 and 308-99 result in replacing the single line of text with an icon. In the illustrated examples provided in FIG. 7B, the condensed view 308-1 includes an icon in the form of a single straight line, the condensed view 308-1 includes an icon in the form of a single straight line, the condensed view 308-3 includes an icon in the form of double straight lines, the condensed view 308-5 includes an icon in the form of a single sinusoidal line, the condensed view 308-51 includes an icon in the form of a non-continuous line, the condensed view 308-53 includes an icon in the form of a dotted line and the condensed view 308-99 includes an icon in the form of a geometric shape (e.g., a rectangle or the like). It should be noted that while FIG. 7B shows the various different forms of an icon, in actual practice, the GUI would likely be configured such that only one form of the icon is configured to be displayed as the condensed view. Such forms of the icon are merely by way of example and, as such, the embodiments of the invention herein described provide for the icon to take on any form conceivable. Similar to the embodiment described in FIGS. 7A and 7B, as the user progresses through the reconciliation process, and more and more condensed views 308/icons are displayed, it is conceivable that all one-hundred (100) of the event/statement entries (or a significant portion thereof) may be displayed to the user in a single view/page (i.e., eliminating, or at least lessening, the need to scroll or page through event/transaction entries). Moreover, the condensed view 308/icons may be configured such that selection (i.e., clicking-on or the like) of the icon re-displays the standard event/transaction entry 302, i.e., the single line of standard font-sized text.

Figure 8A:
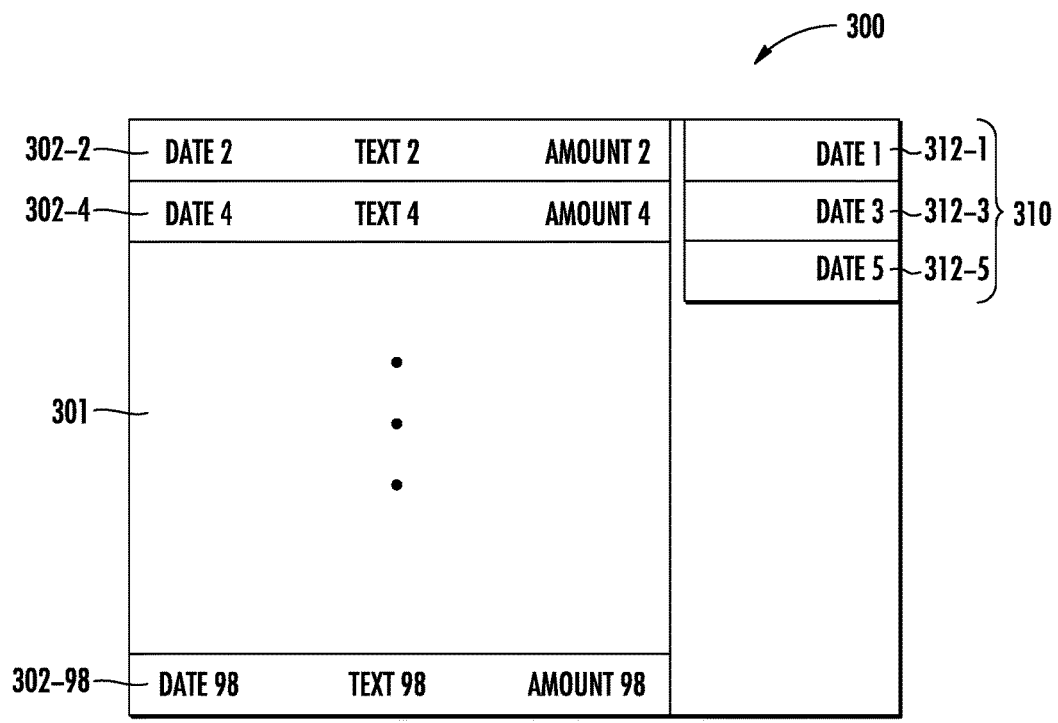
Figure 8B:
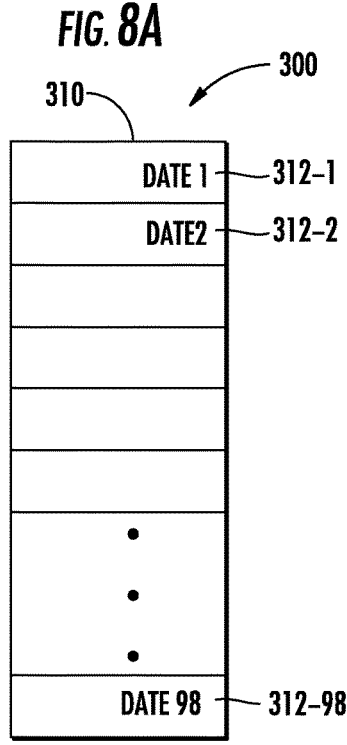

Referring to FIGS. 8A and 8B a GUI 300 is depicted in which the condensed view comprises a second listing 310 of the events/transaction entries that have been selected for reconciliation, in accordance with embodiments of the present invention. In response to a user selecting an event/transaction entry 302 from the first listing 301, the reconciled event is depicted in the second listing 310. Specifically, as shown in FIG. 8A, events/transaction entries 302-1, 302-3 and 312-5 have been selected for reconciliation, creating corresponding reconciliation entries 312-1, 312-3, and 312-5 in second listing 310. The reconciliation entries 312 may include a portion of the text in the original event/transaction entry 302, for example, in the illustrated embodiments, the reconciliation entries include the date on the event/transaction. In the illustrated embodiment, the reconciliation entries 312 in the second listing 310 have been configured as activatable widgets/keys; activation of which may configured to provide for at least one (1) display of further details associated with the event/transaction, and/or (2) re-display of the event/transaction entry 302 in the first listing 301. FIG. 8B depicts a GUI 300 in which all of the event/transaction entries 302 from the first listing 301 of FIG. 8A have been reconciled and, as such appear as reconciled entries 312-1-312-100 in the second listing 310. In such embodiments of the invention, once all of the event transaction entries 302 have been reconciled, the first listing 301 is no longer depicted in the GUI 300.

Figure 9:
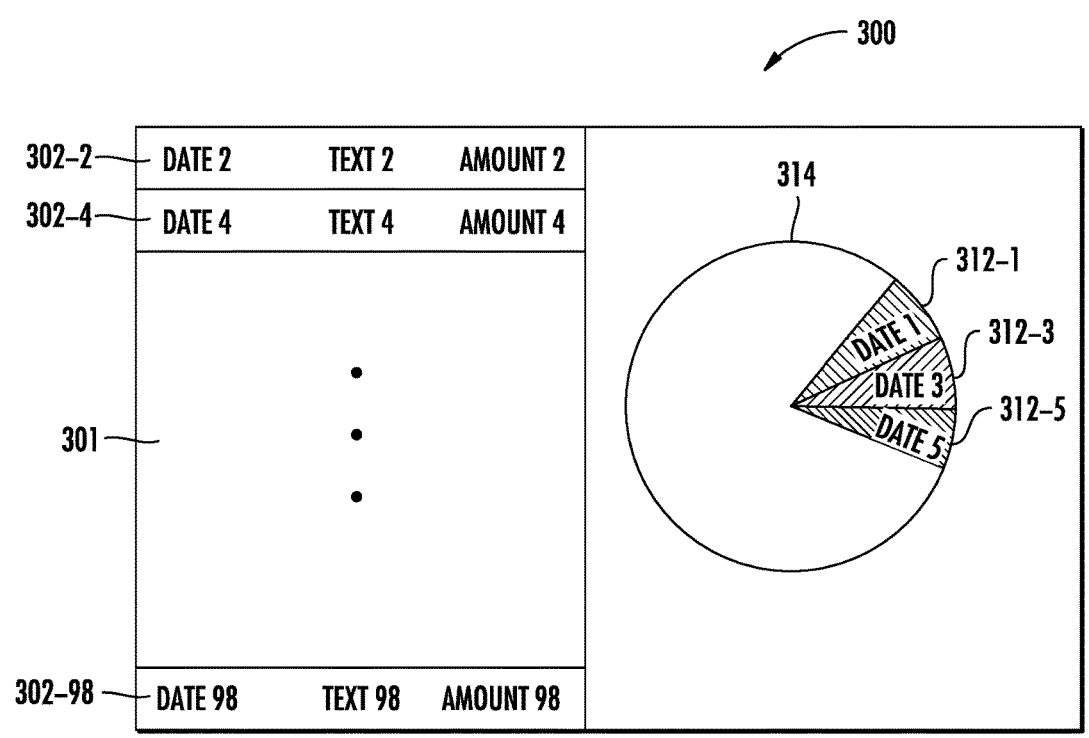

Referring to FIG. 9 a GUI 300 is depicted in which the condensed view comprises a graphical chart 314 that includes positions in the chart for events/transaction entries that have been selected for reconciliation, in accordance with embodiments of the present invention. In the illustrated embodiment of FIG. 9 the graphical chart is a convention pie-chart, although any other type of graphical chart may be configured and implemented in accordance with embodiments of the invention. In the pie-chart configuration, the size of the reconciliation entries is proportional to the overall number of event/transaction entries 302 in the first listing 301, such that the pie-chart will accommodate reconciliation entries 312 for all of the event/transaction entries 302 in the first listing 301. In response to a user selecting an event/transaction entry 302 from the first listing 301, the reconciled event is depicted in the graphical chart 314. Specifically, as shown in FIG. 9, events/transaction entries 302-1, 302-3 and 312-5 have been selected for reconciliation, creating corresponding reconciliation entries 312-1, 312-3, and 312-5 in graphical chart 314. In alternate embodiments, each of the positions in the graphical chart 314 are slotted for a specific event/transaction entry 302 (thus, in such embodiments, the pie chart may have non-continuous reconciliation entries (i.e., pieces of the pie may be missing)). The reconciliation entries 312 may include a portion of the text in the original event/transaction entry 302, for example, in the illustrated embodiments, the reconciliation entries include the date on the event/transaction. In alternate or additional embodiments, the positions within the graphical chart 314 may be visually-coded, such as shaded or color-coded to indicate that a specific event/transaction has been reconciled. Moreover, in the illustrated embodiment, the reconciliation entries 312 in the graphical chart 314 have been configured as activatable widgets/keys; activation of which may configured to provide for at least one (1) display of further details associated with the event/transaction, and/or (2) re-display of the event/transaction entry 302 in the first listing 301.

Figure 10:
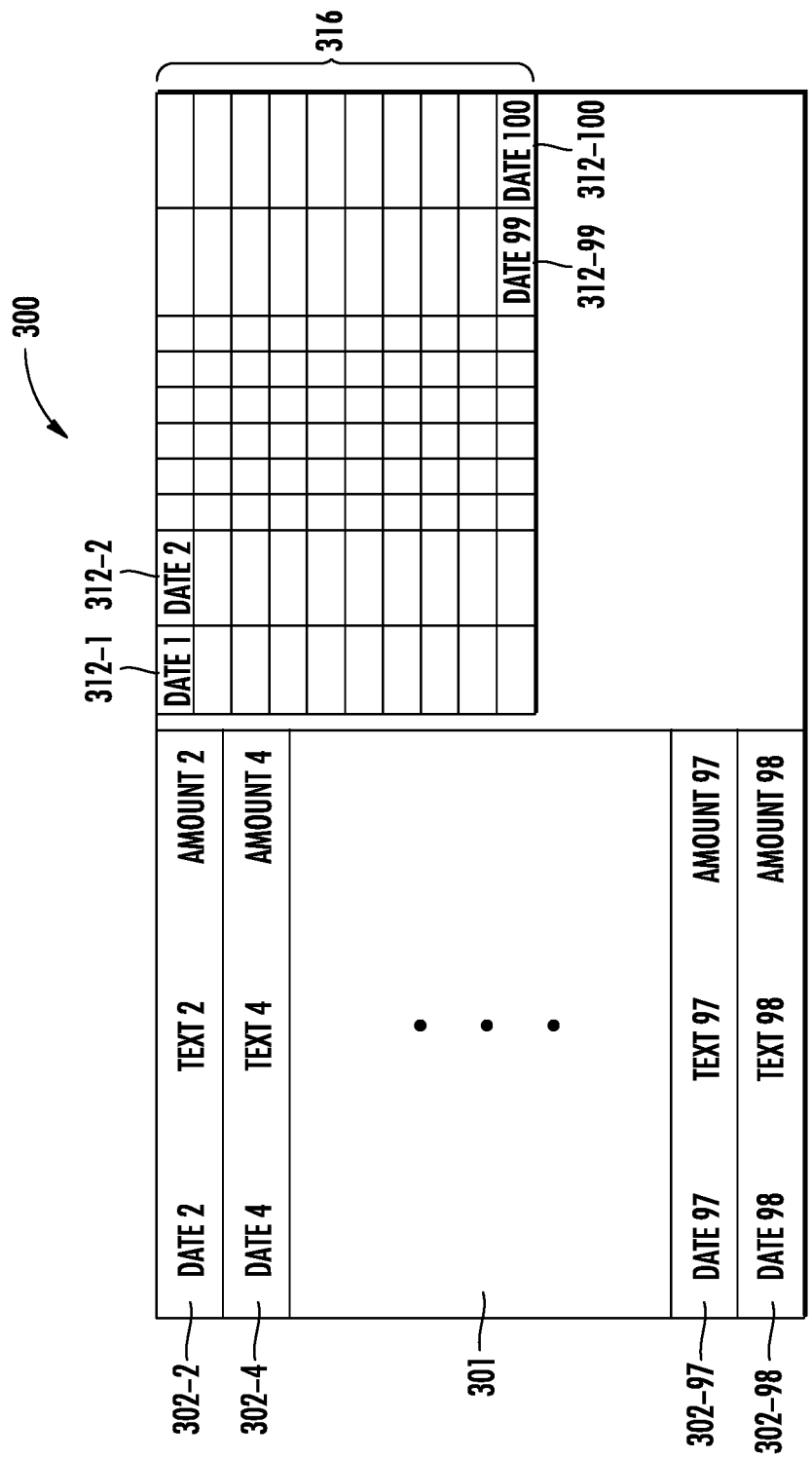

Referring to FIG. 10 a GUI 300 is depicted in which the condensed view comprises a table 316 that includes positions in the table for events/transaction entries that have been selected for reconciliation, in accordance with embodiments of the present invention. In the illustrated embodiment of FIG. 10 the table 316 is configured to accommodate reconciliation entries 312 for all of the event/transaction entries 310 in the first listing 301. In response to a user selecting an event/transaction entry 302 from the first listing 301, the reconciled event is depicted in the table 316. Specifically, as shown in FIG. 10, events/transaction entries 302-1, 302-2, 302-99 and 302-100 have been selected for reconciliation, creating corresponding reconciliation entries 312-1, 312-2, 312-99 and 312-100 in table 316. The reconciliation entries 312 may include a portion of the text in the original event/transaction entry 302, for example, in the illustrated embodiments, the reconciliation entries include the date on the event/transaction. In alternate or additional embodiments, the positions within the table 314 may be visually-coded, such as shaded or color-coded to indicate that a specific event/transaction has been reconciled. Moreover, in the illustrated embodiment, the reconciliation entries 312 in the table 316 have been configured as activatable widgets/keys; activation of which may configured to provide for at least one (1) display of further details associated with the event/transaction, and/or (2) re-display of the event/transaction entry 302 in the first listing 301.

Figure 11:
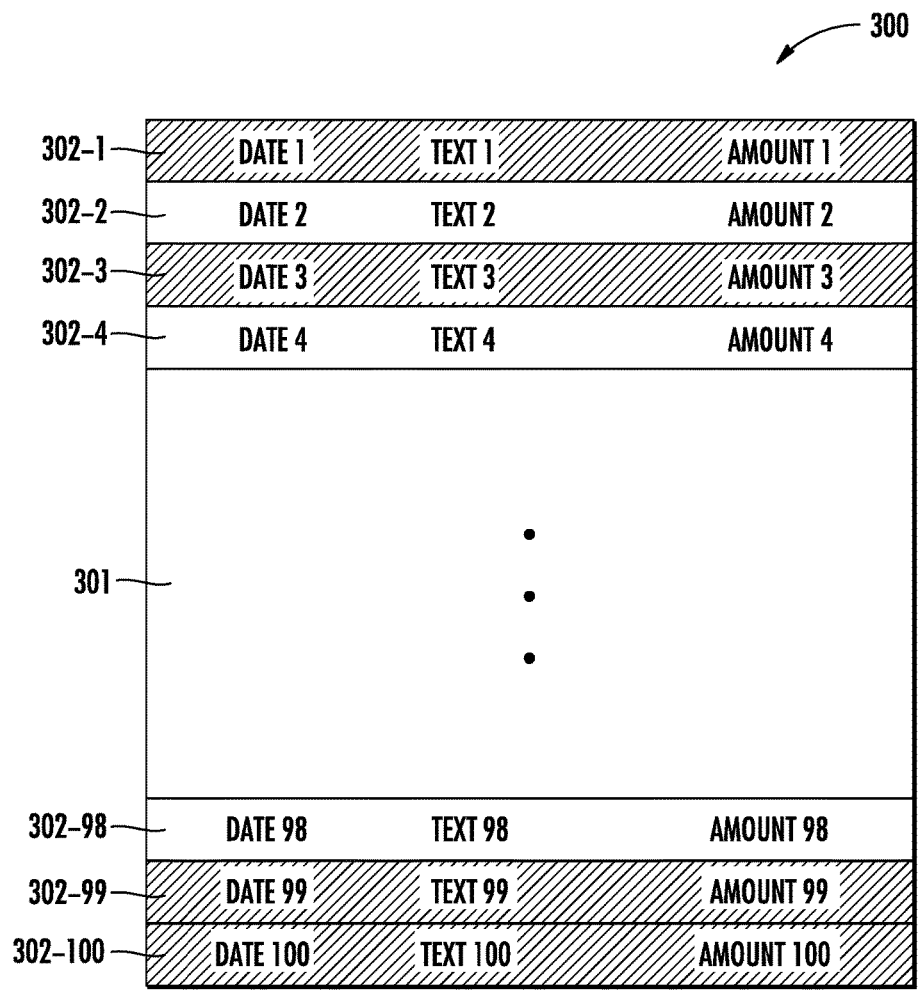

FIG. 11 shows an alternate embodiment of the invention in which the GUI 300 is configured to provide for presenting a visual indicator, such as color-coding, shading or the like of event/transaction entries 302 that have been selected for reconciliation. In such embodiments of the invention, the event/transaction entries 302 may configured such that activation (clicking-on or the like) of the entry results in display of the visual indicator. In other embodiments specific reconciliation keys/widgets may be presented in the GUI (similar to those shown in FIG. 6), which, when activated, result in display of the visual indicator. For example, in the illustrated example of FIG. 11, event/transaction entries 302-1, 302-3, 302-99 and 302-100 have been selected for reconciliation and, as such, are depicted as being either color-coded or shaded to indicate that these entries have been reconciled.

Thus, systems, apparatus, methods, and computer program products described above provide reconciling electronically listed events, such as statements of financial transactions. In this regard, the present invention provides for presenting, within a GUI, events/transactions that a user has designated as reconciled in a condensed view, such that the typical single line of text that represents an event/transaction is either diminished or removed from the GUI. Moreover, in response to presenting the second view, a second listing, a chart and/or table may be presented in the GUI that list or indicate the reconciled events/transactions alongside the listing of events/transactions yet to be reconciled. As a result the user is provided with an "at a glance" view of reconciled events/transactions and can readily ascertain the progress that is being made toward completion of the reconciliation process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for reconciling an electronic statement of events, the apparatus comprising:
   a computing platform having a memory and at least one processor in communication with the memory; and
   a statement of events graphical user interface (GUI) module stored in the memory, executable by the processor and configured to:
   provide display of a graphical user interface (GUI) that includes a first listing of events, each event in the first listing being represented by one or more lines of text, and
   receive a reconciliation acknowledgement input from a user that selects an event from the first listing and, in response to receiving the reconciliation acknowledgement input, replaces the one or more lines of text in the first listing of the GUI with display of a condensed view of the event within the first listing, wherein the condensed view (i) signifies that the event has been reconciled, (ii) occupies less area in the GUI than the one or more lines of text, (iii) provides for the event to be removed from the first listing, and (iv) includes an icon, in place of the one or more lines of text, that signifies that the event has been removed from the first listing.

2. The apparatus of claim 1, wherein the statement of events GUI module is further configured to provide display of a plurality of reconciliation keys, each key associated with a corresponding event in the first listing, wherein the reconciliation acknowledgement input is activation of the reconciliation key associated with the event.

3. The apparatus of claim 1, wherein the statement of events GUI module is further configured to receive the reconciliation acknowledgement input from the user that selects the event from the first listing and, in response to receiving the reconciliation acknowledgement input, replaces the one or more lines of text in the first listing of the GUI with display of the condensed view of the event within the first listing, wherein the condensed view includes a smaller font-size within the one or more lines of text.

4. The apparatus of claim 1, wherein the statement of events GUI module is further configured to receive the reconciliation acknowledgement input from the user that selects the event from the first listing and, in response to receiving the reconciliation acknowledgement input, replaces the one or more lines of text in the first listing of the GUI with display of the condensed view of the event within the first listing, wherein the condensed view includes the icon, wherein the icon includes at least one of, one or more continuous or non-continuous horizontal lines, one or more sinusoidal lines, or a geometric shape that outlines a least a portion of an area previous occupied by the one or more lines of text.

5. The apparatus of claim 1, wherein the statement of events GUI module is further configured to receive the reconciliation acknowledgement input from the user that selects the event from the first listing and, in response to receiving the reconciliation acknowledgement input, replaces the one or more lines of text in the first listing of the GUI with display of the condensed view of the event within the first listing, wherein the condensed view includes the icon, wherein the icon is visually-coded to identify a type of the event.

6. The apparatus of claim 1, wherein the statement of events GUI module is further configured, in response to displaying in the GUI a condensed view of the event, provide display in the GUI of at least one of (i) a second listing of reconciled events including the event, wherein the second listing includes at least one identifying parameter associated with each reconciled event, (ii) a graphical chart that indicates each reconciled event in relation to all of the events in the first listing, or (iii) a table that includes a position for all of the events in the first listing, wherein a visual indicator is provided in a corresponding position of the table to indicate a reconciled event.

7. The apparatus of claim 6, wherein the statement of events GUI module is further configured provide display in the GUI of at least one of (i), (ii) or (iii), wherein the reconciled events in the second listing, the graphical chart or the table are provided as activatable keys that are configured, upon user activation, to provide for at least one of (i) display of further details about the corresponding reconciled event, or (ii) re-display in the first listing of the GUI of the one or more lines of text.

8. The apparatus of claim 1, wherein the statement of events GUI module is further configured to receive a reinstatement input from the user that selects the condensed view of the event from the first listing and, in response to receiving the reinstatement input, replaces the condensed view with re-display, in the first listing of the GUI, of the one or more lines of text.

9. The apparatus of claim 1, wherein the statement of events GUI module is further defined as a financial account statement GUI module.

10. A system for reconciling an electronic financial account statement of transactions, the system comprising:
    a financial account database configured to store records of users credit and debit transactions;
    a financial account statement graphical user interface (GUI) module stored in computing memory, executable by a processor and configured to:
    access the financial account database to retrieve records associated with a user's financial transactions, wherein the financial transactions include at least one of credit transactions or debit transactions;
    in response to retrieving the records, provide network-accessible display of a graphical user interface (GUI) that includes a first listing of financial transaction entries, each entry in the first listing (i) associated with one of the user's financial transactions, (ii) including information from the records and (iii) displayed in one or more lines of text, and
    receive a reconciliation acknowledgement input that selects a financial transaction entry from the first listing and, in response to receiving the reconciliation acknowledgement input, replaces the one or more lines of text in the first listing with display of a condensed view of the financial transaction entry within the first listing, wherein the condensed view (i) signifies that the financial transaction has been reconciled, (ii) occupies less area in the GUI than the one or more lines of text, and (iii) includes an icon, in place of the one or more lines of text, that signifies that the financial transaction entry has been removed from the first listing, wherein the icon includes at least one of, one or more continuous or non-continuous horizontal lines, one or more sinusoidal lines, or a geometric shape that outlines a least a portion of an area previous occupied by the one or more lines of text.

11. The system of claim 10, wherein the financial account statement GUI module is further configured to receive the reconciliation acknowledgement input that selects the financial transaction entry from the first listing and, in response to receiving the reconciliation acknowledgement input, replaces the one or more lines of text in the first listing of the GUI with display of the condensed view of the financial transaction entry within the first listing, wherein the condensed view includes a smaller font-size within the one or more lines of text.

12. The system of claim 10, wherein the financial account statement GUI module is further configured to receive the reconciliation acknowledgement input that selects the financial transaction entry from the first listing and, in response to receiving the reconciliation acknowledgement input, replaces the one or more lines of text in the first listing of the GUI with display of the condensed view of the financial transaction entry within the first listing, wherein the condensed view provides for the financial transaction entry to be removed from the first listing.

13. The system of claim 12, the financial account statement GUI module is further configured to receive the reconciliation acknowledgement input that selects the financial transaction entry from the first listing and, in response to receiving the reconciliation acknowledgement input, replaces the one or more lines of text in the first listing of the GUI with display of the condensed view of the financial transaction entry within the first listing, wherein the condensed view includes an icon, in place of the one or more lines of text, that signifies that the financial transaction entry has been removed from the first listing, wherein the icon is visually-coded to identify a type of financial transaction associated with the financial transaction entry.

14. The system of claim 10, wherein the financial account statement GUI module is further configured, in response to displaying in the GUI a condensed view of the financial transaction entry, provide display in the GUI of at least one of (i) a second listing of reconciled financial transaction, wherein each entry in the second listing includes at least one identifying parameter associated with a corresponding financial transaction, (ii) a graphical chart that indicates each reconciled financial transaction in relation to all of the financial transactions in the first listing, or (iii) a table that includes a position for all of the financial transactions in the first listing, wherein a visual indicator is provided in a corresponding position of the table to indicate a reconciled financial transaction.

15. A computer program product including a non-transitory computer-readable medium, the computer-readable medium comprising:

a first set of codes for causing a computer to access a financial account database to retrieve records associated with a user's financial transactions, wherein the financial transactions include at least one of credit transactions or debit transactions;

a second set of codes for causing a computer to, in response to retrieving the records, provide network-accessible display of a graphical user interface (GUI) that includes a first listing of financial transaction entries, each entry in the first listing (i) associated with one of the user's financial transactions, (ii) including information from the records, and (iii) displayed in one or more lines of text, and a third set of codes for causing a computer to receive a reconciliation acknowledgement input that selects a financial transaction entry from the first listing and, in response to receiving the reconciliation acknowledgement input, replaces the one or more lines of text in the first listing with display of a condensed view of the financial transaction entry within the first listing, wherein the condensed view (i) signifies that the financial transaction has been reconciled, (ii) occupies less area in the GUI than the one or more lines of text and (iii) includes an icon, in place of the one or more lines of text, that signifies that the financial transaction entry has been removed from the first listing, wherein the icon includes at least one of, one or more continuous or non-continuous horizontal lines, one or more sinusoidal lines, or a geometric shape that outlines a least a portion of an area previous occupied by the one or more lines of text.

16. The computer program product of claim 15, wherein the third set of codes is further configured to cause the computer to receive the reconciliation acknowledgement input that selects the financial transaction entry from the first listing and, in response to receiving the reconciliation acknowledgement input, replaces the one or more lines of text in the first listing of the GUI with display of the condensed view of the financial transaction entry within the first listing, wherein the condensed view includes a smaller font-size within the one or more lines of text.

17. The computer program product of claim 15, wherein the third set of codes is further configured to cause the computer to receive the reconciliation acknowledgement input that selects the financial transaction entry from the reconciliation acknowledgement listing and, in response to receiving the reconciliation acknowledgement input, replaces the one or more lines of text in the first listing of the GUI with display of the condensed view of the financial transaction entry within the first listing, wherein the condensed view provides for the financial transaction entry to be removed from the first listing.

* * * * *